United States Patent [19]

Epstein

[11] 4,020,283
[45] Apr. 26, 1977

[54] MSK DIGITAL DATA SYNCHRONIZATION DETECTOR

[75] Inventor: Marvin Aaron Epstein, Monsey, N.Y.

[73] Assignee: International Telephone and Telegraph Corporation, Nutley, N.J.

[22] Filed: Nov. 4, 1975

[21] Appl. No.: 628,710

[52] U.S. Cl. .................... 178/88; 178/69.1; 235/181; 307/233 R; 328/133
[51] Int. Cl.² .................... H04L 27/10; H03K 7/06
[58] Field of Search ............... 235/181; 178/66, 88, 178/69.5 R; 325/320–324; 307/232, 233, 269; 328/133, 155

[56] References Cited

UNITED STATES PATENTS

| | | | |
|---|---|---|---|
| 3,772,600 | 11/1973 | Natali | 178/69.5 R |
| 3,789,307 | 1/1974 | Clark | 328/155 |
| 3,838,214 | 9/1974 | Lind | 178/69.5 R |

*Primary Examiner*—Felix D. Gruber

*Attorney, Agent, or Firm*—John T. O'Halloran; Alfred C. Hill

[57] ABSTRACT

An input MSK digital data signal is correlated with MSK correlation waveforms to produce first and second correlation signals. These first and second correlation signals are operated on by an arithmetic unit to calculate many time and phase conditions of the MSK digital data signal at one time and to produce third, fourth and fifth correlation signals as a function of assumed bit times. These third, fourth and fifth correlation signals are operated on by a ratio calculator to produce a ratio signal proportional to the ratio of a minimum magnitude squared to a maximum magnitude squared for all carrier phase angles for each of the assumed bit times. A synchronization detected signal is produced when the value of the ratio signal is less than a given amplitude threshold.

9 Claims, 4 Drawing Figures

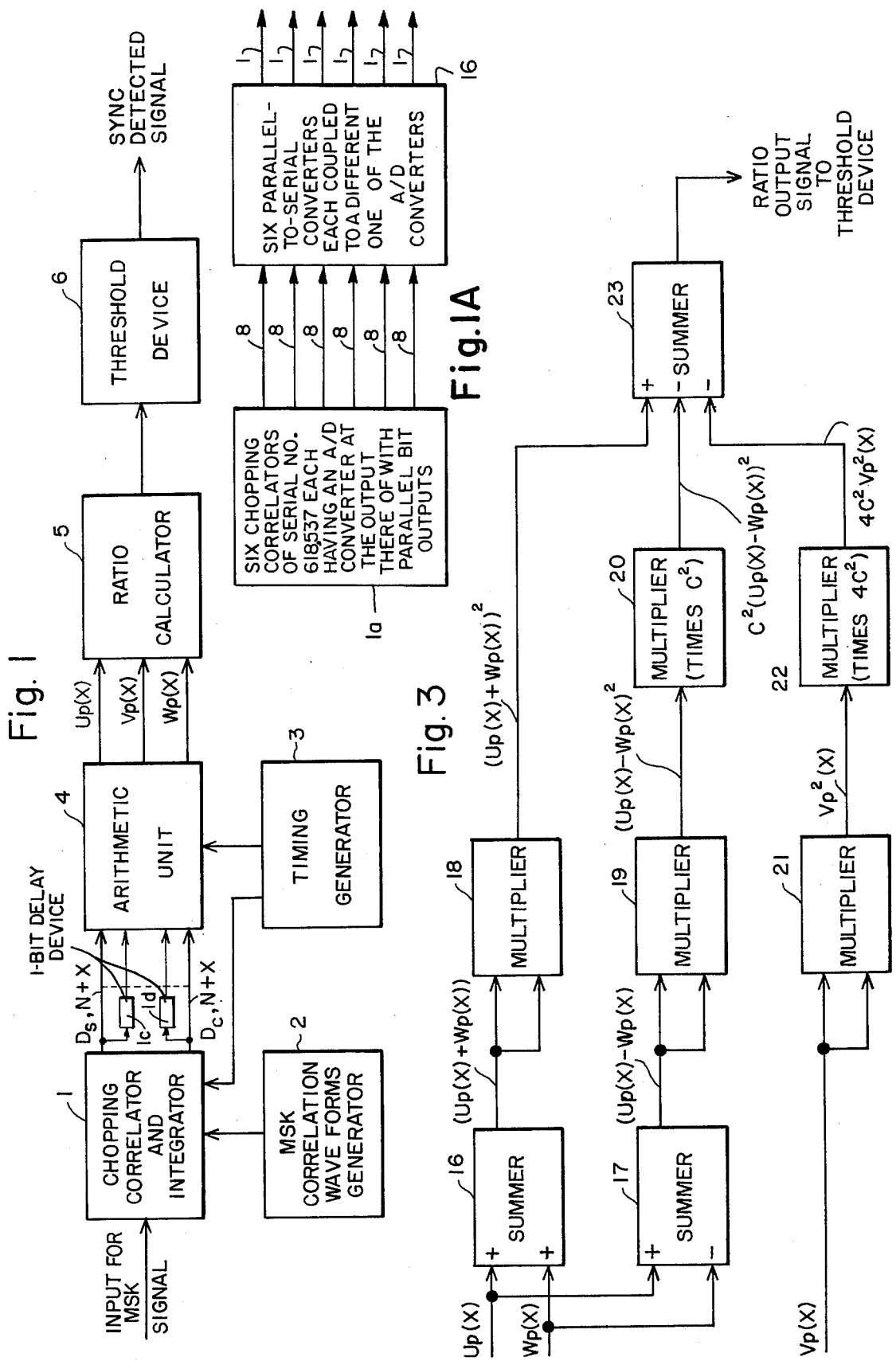

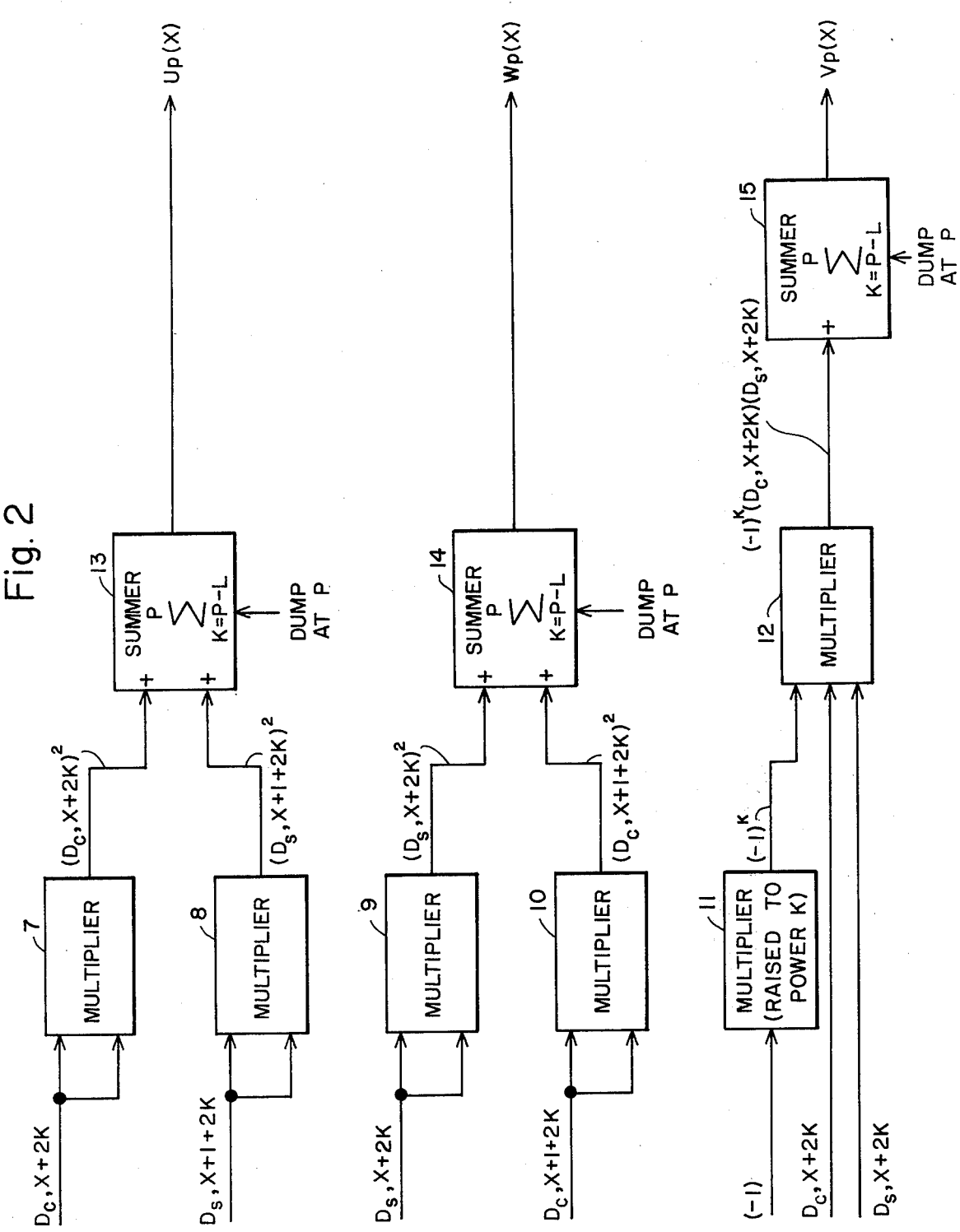

MSK DIGITAL DATA SYNCHRONIZATION DETECTOR

BACKGROUND OF THE INVENTION

This invention relates to MSK digital data transmission systems and more particularly to a MSK digital data synchronization detector for such systems.

MSK is an abbreviation for "minimum shift keying" and may be defined as a signal where the transmitted wave is a phase continuous frequency shift waveform. For each unit time interval the instantaneous frequency is a constant being either a high frequency or a low frequency relative to a center frequency. The high frequency is such as to advance by one phase revolution relative to the carrier frequency in four unit time intervals. The low frequency is such as to fall behind by one phase revolution relative to the carrier frequency in four unit time intervals.

MSK digital data synchronization detectors are used to determine the presence or absence of a MSK digital data signal and to synchronize in time and phase to such a signal. A MSK signal is hard to detect because there is no amplitude modulation or particular preferred phase that can be detected.

One prior art MSK digital data synchronization detector employs a method of detection which requires searching in various carrier phase and bit times looking for a stable tracking procedure. Stable tracking behavior and low orthogonal signals at the sampling time indicate the presence of a MSK digital data signal.

One of the disadvantages of the above-mentioned prior art detector is that it requires a higher signal-to-noise ratio or multiple search at a given signal-to-noise ratio to acquire synchronization with the same probability of acquisition and false alarm.

SUMMARY OF THE INVENTION

An object of the present invention is to provide a MSK digital data synchronization detector that overcomes the disadvantage of the above-mentioned prior art MSK digital data synchronization detector.

In accordance with the principles of the present invention, the MSK digital data signal detector disclosed synchronizes better than the above-mentioned prior art because it provides a search using a calculation which mathematically considers many conditions of the MSK digital data signal at one time rather than using a tracking loop which can cover only one phase and one bit time condition at one time. In the technique of the present invention a number of time calculations for each of two phase calculations per time sample are made and then a calculation is made of the phase dependence using the known phase progression properties of the MSK digital data signal. If a MSK digital data signal is present, this will be indicated by a phase dependence near the correct bit times. Once an indication of signal presence has shown up, there is also an indication of the correct synchronism (the correct bit time has a maximum phase dependence and the correct phase has the maximum phase value). This signal presence indication can be followed up to either verify the MSK digital data signal presence or to reject the presence of a MSK digital data signal.

A feature of the present invention is the provision of a minimum shift keying (MSK) digital data synchronization detector comprising: a first source of the digital data; first means coupled to the first source to produce first and second correlation signals; second means coupled to the first means, the second means being responsive to the first and second correlation signals to calculate many time and phase conditions of the digital data at one time to produce third, fourth and fifth correlation signals as a function of assumed bit times; and third means coupled to the second means, the third means being responsive to the third, fourth and fifth correlation signals to produce a ratio signal proportional to a ratio of a minimum magnitude squared to a maximum magnitude squared for all carrier phase angles for each of the assumed bit times and to produce a synchronization detected signal when the value of the ratio signal is less than a given amplitude threshold.

BRIEF DESCRIPTION OF THE DRAWING

Above-mentioned and other features and objects of this invention will become more apparent by reference to the following description taken in conjunction with the accompanying drawing, in which:

FIG. 1 is a schematic block diagram of the MSK digital data synchronization detector in accordance with the principles of the present invention;

FIG. 1A is a schematic block diagram of the modification of the chopping correlator and integrator of my copending application Ser. No. 618,537, filed Oct. 1, 1975 to provide chopping correlator and integrator 1 of FIG. 1;

FIG. 2 is a schematic block diagram of the arithmetic unit of FIG. 1 in accordance with the principles of the present invention; and FIG. 3 is a schematic block diagram of the ratio calculator of FIG. 1 in accordance with the principles of the present invention.

DESCRIPTION OF THE PREFERRED EMBODIMENT

Referring to FIG. 1, the input MSK signal r(t) is coupled to chopping correlator and integrator 1 with the input MSK signal being correlated with standard MSK correlation waveforms, as provided by generator 2, at several assumed bit times. Correlator and integrator 1 is fully disclosed in my copending application Ser. No. 618,537, filed Oct. 1, 1975, whose disclosure is incorporated herein by reference. The correlator and integrator 1 includes six chopping correlators of the above-cited copending application as illustrated in FIG. 1 thereof each of which is implemented as illustrated in FIG. 2 thereof and represented in FIG. 1A of the present application by block 1a. Each of the correlators of the above-cited copending application includes an A/D (analog-to-digital) converter at the output thereof with eight parallel bit outputs. Block 1b of FIG. 1A of the present application includes six parallel-to-serial converters each coupled to a different one of the A/D converters of block 1a to convert the eight parallel bit outputs from its associated A/D converter to a serial output of eight bits. Block 1b represents the modification of the above-cited copending application to implement chopping correlator and integrator 1 of FIG. 1 of the present invention.

MSK correlation waveforms generator 2 may include sine and cosine generators whose outputs are coupled to a multiplier to provide the standard MSK correlation waveforms as defined in the following equations:

$$\sin w_o t \sin w_f (t - (N+X)T) \quad (1)$$

$$\cos w_o t \sin w_f (t - (N + X)T) \quad (2)$$

where $w_o$ is equal to the carrier frequency in radians, $w_f$ is equal to the modulating frequency in radians, $t$ is equal to time, $T$ is equal to a unit time interval, $N$ is equal to an integer 0, 1, 2, 3 . . . and $X$ is equal to assumed bit times to align the correlation waveforms with the input MSK digital data signal.

A practical procedure for the operation of correlator and integrator 1 is to use two values of $X$; namely, 0 and ½, where $w_f T = \pi/2$.

Timing generator 3 provides timing signals to control the integrators, the multiplexers, the analog-to-digital converter and serial-to-parallel converter of correlator and integrator 1. Timing generator 3 may be implemented by a stabilized clock source coupled to a digital counter with the output of various stages of this digital counter being coupled to gating circuits to provide the desired timing signals to perform the desired time control of the above-mentioned elements of correlator and integrator 1. Timing generator 3 also provides appropriate timing signals for the arithmetic unit 4.

Correlator and integrator 1 provide two output signals; namely, a sine correlation signal and a cosine correlation signal which are defined in equations (3) and (4) as indicated below:

$$D_s, N + X = \int_{(N+X-2)T}^{(N+X)T} r(t) \sin w_o t \sin w_f(t - (N + X)T) \, dt \quad (3)$$

$$D_c, N + X = \int_{(N+X-2)T}^{(N+X)T} r(t) \cos w_o t \sin w_f(t - (N + X)T) \, dt \quad (4)$$

, where $D_s$ is the sine correlation signal, $(N + X)$ equals bit time and indicates the end of the integration, $D_c$ is equal to the cosine correlation signal and the other terms of equations (3) and (4) are as previously defined. The $D_s, N + X$ and $D_c, N + X$ correlation signals are coupled to arithmetic unit 4 and using appropriate timing signals from timing generator 3 form correlation signals $U_P(X)$, $W_P(X)$ and $V_P(X)$ as a function of assumed bit times $X$. These three correlation waveforms at the output of arithmetic unit 4 are defined by the following equations:

$$U_P(X) = \sum_{K=P-L}^{P} (D_c, X + 2K)^2 + (D_s, X + 1 + 2K)^2 \quad (5)$$

$$W_P(X) = \sum_{K=P-L}^{P} (D_s, X + 2K)^2 + (D_c, X + 1 + 2K)^2 \quad (6)$$

$$V_P(X) = \sum_{K=P-L}^{P} (-1)^K \cdot D_c, X + 2K \cdot D_s, X + 2K \quad (7)$$

, where $N$ of equations (3) and (4) has two values for each of equations (3) and (4). The first value of $N$ is equal to $2K$ for the correlation signals $D_s$ and $D_c$ at the present data bit time. The second value of $N$ is equal to $(1 + 2K)$ for the correlation signals $D_s$ and $D_c$ shifted by one data bit time with respect to the present data bit time. This later value of $N$ is generated by passing the correlation signals $D_s$ and $D_c$ through time delay devices 1c and 1d having a time delay equal to one data bit time. With these values for $N$ a number of time calculations for each of two phase calculations per time sample can be made. In the above equations (5) – (7) $P$ is equal to the present bit number and the end of the summation, $L$ is equal to the number of bits preceding bit $P$ and $K$ is the summation index. Each sum of equations (5) – (7) represents the sum of $(2L + 2)$ terms ending at the $(X + 2P + 1)$ term for assumed bit times $X$.

The correlation waveforms at the output of arithmetic unit 4 are coupled to ratio calculator 5 to determine the ratio of a minimum magnitude squared to maximum magnitude squared for all carrier phase angles for each assumed bit time $X$. This ratio is given as:

Ratio $(X) =$ $$\frac{U_P(X) + W_P(X) - \sqrt{(U_P(X) - W_P(X))^2 + 4 V_P^2(X)}}{U_P(X) + W_P(X) + \sqrt{(U_P(X) - W_P(X))^2 + 4 V_P^2(X)}} < TH, \quad (8)$$

where TH is equal to the amplitude threshold value of threshold device 6. By transforming equation (8) as follows implementation of ratio calculator can be determined. Multiplying both sides of equation (8) by $$(U_P(X) + W_P(X) + \sqrt{(U_P(X) - W_P(X))^2 + 4 V_P^2(X)}$$

there is obtained $$(U_P(X) + W_P(X)) - \sqrt{(U_P(X) - W_P(X))^2 + 4 V_P^2(X)} < TH(U_P(X) + W_P(X)) + TH \sqrt{(U_P(X) - W_P(X))^2 + 4 V_P^2(X)} \quad (9)$$

Reorganize equation (9) as follows:

$$(U_P(X) + W_P(X)) - TH(U_P(X) + W_P(X)) < \sqrt{(U_P(X) - W_P(X))^2 + 4 V_P^2(X)} + TH \sqrt{(U_P(X) - W_P(X))^2 + 4 V_P^2(X)} \quad (10)$$

Reorganize equation (10) as follows:

$$(U_P(X) + W_P(X))(1 - TH) < (1 + TH) \sqrt{(U_P(X) - W_P(X))^2 + 4 V_P^2(X)} \quad (11)$$

Divide both sides of equation (11) by $(1 - TH)$ and obtain the following:

$$(U_P(X) + W_P(X)) < \left(\frac{1 + TH}{1 - TH}\right)\sqrt{(U_P(X) - W_P(X))^2 + 4 V_P^2(X)} \quad (12)$$

Setting $$\frac{1 + TH}{1 - TH} = C,$$

a constant, equation (12) can be written as follows:

$$(U_P(X) + W_P(X)) < C \sqrt{(U_P(X) - W_P(X))^2 + 4 V_P^2(X)} \quad (13)$$

Squaring both sides of equation (13) there is obtained the following equation:

$$(U_P(X) + W_P(X))^2 < C^2 ((U_P(X) - W_P(X))^2 + 4 V_P^2(X)) \quad (14)$$

Reorganizing equation (14) there is obtained the following equation from which the implementation of ratio calculator 5 can be derived.

$$(U_P(X) + W_P(X))^2 - C^2 ((U_P(X) - W_P(X))^2 - 4 V_P^2(X)) < 0 \quad (15)$$

The signal at the output of calculator 5 is the ratio signal and is tested for each assumed bit time against an amplitude threshold value in threshold device 6. The presence of a signal and, hence, synchronization is indicated when the value of the ratio signal is less than the amplitude threshold of device 6. If the ratio signal for several bit times are below the amplitude threshold value, a choice of best bit time is made by an estimate of the bit time or position with the largest ratio. A simple estimation procedure is to try a number of X values and pick the value with the largest ratio. An estimate of the proper phase angle can also be made as $\frac{1}{2} \tan^{-1} [2V_p(X)/(U_P(X) - W_P(X))]$.

The digital data synchronization detector just described with reference to FIG. 1 can be used for detecting any signal which can be put into the form of sensitivity to phase as a function of assumed bit times. Two cases known are (1) straight MSK modulation and (2) the triangles formed by MSK modulated 7 bit Baudot characters.

Referring to FIG. 2 there is illustrated therein a schematic block diagram of the arithmetic unit 4 of FIG. 1. The implementation of unit 4 disclosed in FIG. 2 is derived from equations (5) – (7). This implementation as illustrated in FIG. 2 includes multipliers 7, 8, 9, 10, 11 and 12 having the indicated inputs thereto and the indicated outputs therefrom which conform to the terms of equations (5) – (7). The output signals from multipliers 7 and 8 are coupled to a summer 13 which is dumped at time P (the end of the summation) by a timing signal from generator 3 of FIG. 1 and generates the correlation signal $U_P(X)$. The output from multipliers 9 and 10 are coupled to summer 14 which also is dumped at time P (by the timing signal from generator 3 of FIG. 1) to provide the correlation signal $W_P(X)$. The output from multiplier 12 is coupled to summer 15 which also is dumped at time P (by the timing signal from generator 3 of FIG. 1) to produce the correlation signal $V_P(X)$.

Referring to FIG. 3 there is disclosed therein one possible implementation of the ratio calculator 5 of FIG. 1, which is derived from equation (15) which resulted from transformation of the ratio set forth in equation (8). In accordance with equation (15) the ratio calculator 5 of FIG. 1 includes summers 16 and 17 having the indicated correlation signal inputs coupled thereto to provide the desired output signal as dictated by equation (15) and illustrated in FIG. 3. The output from summer 16 is coupled to multiplier 18 to provide the first term of equation (15). The output from summer 17 is coupled to multiplier 19 and then to multiplier 20 to produce the second term of equation (15). Multiplier 21 having the correlation signal input as illustrated and multiplier 22 cooperate to provide the third term of equation (15). The outputs from multipliers 18, 20 and 22 are coupled to a summer 23 which provides the ratio output signal which is coupled to threshold device 6 of FIG. 1.

It will be noted that summer 17 and summer 23 have certain ones of their input terminals labeled with a minus sign. This minus sign indicates that the input signal applied thereto is inverted prior to addition with the other input signals in the associated summers 17 and 23.

While I have described above the principles of my invention in connection with specific apparatus it is to be clearly understood that this description is made only by way of example and not as a limitation to the scope of my invention as set forth in the objects thereof and in the accompanying claims.

I claim:
1. A minimum shift keying (MSK) digital data synchronization detector comprising:
   an input for said digital data;
   first means coupled to said input to produce five different output signals, a first of said five output signals being a first correlation signal, a second of said five output signals being a second correlation signal shifted in phase by one data bit time, a third of said five output signals being said first correlation signal shifted in phase one data bit time, a fourth of said first output signals being said second correlation signal and a fifth of said five output signals equals a minus one value;
   second means coupled to said first means, said second means being responsive to said five output signals to produce third, fourth and fifth correlation signals as a function of assumed bit times; and
   third means coupled to said second means, said third means being responsive to said third, fourth and fifth correlation signals to produce a ratio signal proportional to a ratio of a minimum magnitude squared to a maximum magnitude squared for all carrier phase angles for each of said assumed bit times and to produce a synchronization detected signal when the value of said ratio signal is less than a given amplitude threshold.

2. A detector according to claim 1, wherein said first means includes
   a chopping correlator and integrator coupled to said input,
   a source of MSK correlation waveforms coupled to said chopping correlator and integrator, and
   a source of timing signals coupled to said chopping correlator and integrator.

3. A detector according to claim 1, wherein said second means includes
   an arithmetic unit coupled to said first means, and
   a source of timing signals coupled to said arithmetic unit.

4. A detector according to claim 3, wherein said arithmetic unit includes
   a first multiplier coupled to said first means, said first multiplier squaring said first of said five output signals,
   a second multiplier coupled to said first means, said second multiplier squaring said second of said five output signals,
   a first summer coupled to said first and second multipliers, said first summer summing said squared first of said five output signals and said squared second of said five output signals for a given number of data bits to produce said third correlation signal, a third multiplier coupled to said first means, said third multiplier squaring said third of said five output signals, a fourth multiplier coupled to said first means, said fourth multiplier squaring said fourth of said five output signals, a second summer coupled to said third and fourth multiplier, said second summer summing said squared third of said five output signal and said squared fourth of said five output signals for said given number of data bits to produce said correlation signal a fifth multiplier coupled to said first means to raise said minus one value by a given power, a sixth multiplier coupled to said first means and said fifth multiplier, said sixth multiplier multiplying said minus one value raised to said given power, said first of said five output signals and said second of said five output signals to produce a multiplied signal, and a third summer coupled to said sixth multiplier, said third summer summing said multiplier signal for said given number of data bits to produce said fifth correlation signal.

5. A detector according to claim 1, wherein said third means includes
a ratio calculator coupled to said second means, said ratio calculator producing said ratio signal, and
a threshold device having said given amplitude threshold coupled to said ratio calculator, said threshold device producing said synchronization detected signal when the value of said ratio signal is less than said given amplitude threshold.

6. A detector according to claim 5, wherein said ratio calculator includes
a first summer coupled to said second means, said first summer summing said third and fourth correlation signals to produce a first output signal,
a second summer coupled to said second means, said second summer summing said third correlation signal and the inverse of said fourth correlation signal to produce a second output signal,
a first multiplier coupled to said first summer, said first multiplier squaring said first output signal,
a second multiplier coupled to said second summer, said second multiplier squaring said second output signal,
a third multiplier coupled to said second means, said third multiplier squaring said fifth correlation signal,
a fourth multiplier coupled to said second multiplier, said fourth multiplier having a first multiplication factor equal to a given constant value squared to multiply said squared second output signal by said first factor to produce a third output signal,
a fifth multiplier coupled to said third multiplier, said fifth multiplier having a second multiplication factor equal to four times said given constant value squared to multiply said squared fifth correlation signal by said second factor to produce a fourth output signal, and
a third summer coupled to said first, fourth and fifth multipliers, said third summer summing said squared first output signal and the inverse of said third and fourth output signals to produce said ratio signal.

7. A detector according to claim 1, wherein said second means includes a source of timing signals, and
an arithmetic unit coupled to said first means and said second source, said arithmetic unit calculates a number of time values and two phase values per time sample and then calculates from said time values and phase values the phase dependence of said digital data using known phase progression properties of said digital data.

8. A detector according to claim 1, wherein said first means includes
a chopping correlator and integrator coupled to said input,
a source of MSK correlation waveforms coupled to said chopping correlator and integrator, and
a source of timing signals coupled to said chopping correlator and integrator;

said second means includes
an arithmetic unit coupled to said chopping correlator and integrator, and
said source of timing signals coupled to said arithmetic unit; and said third means includes
a ratio calculator coupled to said arithmetic unit, said ratio calculator producing said ratio signal, and
a threshold device having said given amplitude threshold coupled to said ratio calculator, said threshold device producing said synchronization detected signal when the value of said ratio signal is less than said given amplitude threshold.

9. A detector according to claim 1, wherein said first means includes
a chopping correlator and integrator coupled to said input,
a source of MSK correlation waveforms coupled to said chopping correlator and integrator, and
a source of timing signals coupled to said chopping correlator and integrator;

said second means includes
a first multiplier coupled to said chopping correlator and integrator, said first multiplier squaring said first of said five output signals to produce a first output signal,
a second multiplier coupled to said chopping correlator and integrator, said second multiplier squaring said second of said five output signals to produce a second output signal,
a first summer coupled to said first and second multipliers and said source of timing signals, said first summer summing said first and second output signals for a given number of data bits to produce said third correlation signal,
a third multiplier coupled to said chopping correlator, said third multiplier squaring said third of said five output signals to produce a third output signal,
a fourth multiplier coupled to said chopping correlator, said fourth multiplier squaring said fourth of said five output signals to produce a fourth output signal,
a second summer coupled to said third and fourth multiplier and said source of timing signals, said second summer summing said third and fourth output signals for said given number of data bits to produce said fourth correlation signal,
a fifth multiplier coupled to said first means to raise said minus one value by a given power to produce a fifth output signal, a sixth multiplier coupled to said chopping correlator and integrator and said fifth multiplier, said sixth multiplier multiplying said fifth output signal, said first of said five output signals and said second of said five output signals to produce a sixth output signal, and a third summer coupled to said sixth multiplier and said source of timing signals, said third summer summing said sixth output signal for said given number of data bits to produce said fifth correlation signal; and said third means includes
- a forth summer coupled to said first and second summers, said fourth summer summing said third and fourth correlation signals to produce a seventh output signal,
- a fifth summer coupled to said first and second summers, said fifth summer summing said third correlation signal and the inverse of said fourth correlation signal to produce an eighth output signal,
- a seventh multiplier coupled to said fourth summer, said seventh multiplier squaring said seventh output signal,
- an eighth multiplier coupled to said fifth summer, said eighth multiplier squaring said eighth output signal,
- a ninth multiplier coupled to said third summer, said ninth multiplier squaring said fifth correlation signal,
- a tenth multiplier coupled to said eighth multiplier, said tenth multiplier having a first multiplication factor equal to a given constant value squared to multiply said squared eighth output signal by said first factor to produce a ninth output signal,
- an eleventh multiplier coupled to said ninth multiplier, said eleventh multiplier having a second multiplication factor equal to four times said first factor to multiply said squared fifth correlation signal by said second factor to produce a tenth output signal,
- a sixth summer coupled to said seventh, tenth and eleventh multipliers, said sixth summer summing said squared seventh output signals and the inverse of said ninth and tenth output signals to produce said ratio signal, and
- a threshold device having said given amplitude threshold coupled to said sixth summer, said threshold device producing said synchronization detected signal when the value of said ratio signal is less than said given amplitude threshold.

* * * * *